United States Patent [19]

Neri et al.

[11] Patent Number: 5,158,998

[45] Date of Patent: Oct. 27, 1992

[54] METHOD FOR STABILIZING LACQUERS AND COATINGS, AND THE STABILIZED COMPOSITIONS OBTAINED

[75] Inventors: Carlo Neri, San Donato Milanese; Francesco Gratani, Sesto San Giovanni; Gianluigi Landoni, Milan; Silvestro Costanzi, San Giuliano Milanese, all of Italy

[73] Assignee: Enichem Synthesis S.p.A., Italy

[21] Appl. No.: 671,263

[22] Filed: Mar. 18, 1991

[30] Foreign Application Priority Data

Mar. 23, 1990 [IT] Italy ............... 19801 A/90

[51] Int. Cl.⁵ ............... C08K 5/34; C08K 5/35
[52] U.S. Cl. ............... 524/96; 524/99; 524/104
[58] Field of Search ............... 524/99, 104, 96

[56] References Cited

U.S. PATENT DOCUMENTS

| | | | |
|---|---|---|---|
| 4,946,880 | 8/1990 | Costanzi et al. | 524/99 |
| 4,952,619 | 8/1990 | Greco et al. | 524/99 |
| 5,026,750 | 6/1991 | Ravichandran | 524/99 |
| 5,051,458 | 9/1991 | Costanzi et al. | 524/99 |

Primary Examiner—Paul R. Michl
Assistant Examiner—Tae H. Yoon
Attorney, Agent, or Firm—Shea & Gould

[57] ABSTRACT

Acrylic or alkyd resin and polyester based covering or coating compositions are stabilized against the action of light and moisture by adding, possibly in the presence of conventional stabilizers and antioxidants, at least one compound containing at least one N-substituted, sterically hindered piperidino, morpholino or pyrrolidino group, and at least one silyl function, or a polymer structure with a polyorganosiloxane structure containing sterically hindered piperidino groups in the molecule.

10 Claims, No Drawings

METHOD FOR STABILIZING LACQUERS AND COATINGS, AND THE STABILIZED COMPOSITIONS OBTAINED

This invention relates to a method for stabilizing acrylic or alkyd resin and polyester based lacquers and coatings against the action of light and moisture, the method consisting of adding to the substance concerned at least one compound containing an N-substituted, sterically hindered piperidino, morpholino or pyrrolidino group, and at least one silyl function; the sterically hindered piperidino group can be present in a polyorganosiloxane structure. The invention also relates to the lacquer or coating compositions stabilized in this manner.

It is known for example from Japanese published patent applications No. 52/132050 and No. 53/60942 that lacquers can be stabilized by adding conventional ultraviolet absorption agents. However, these stabilizers ensure good results only if used in high concentration. In addition, they sometimes give the resultant mixture an undesirable coloration.

It is likewise known that stabilizing effects can be obtained using polyalkylpiperidine derivatives, such as described in U.S. Pat. Nos. 4,314,933 and 4,426,472, however these derivatives do not produce a homogeneous effect and are not always free of the aforesaid drawbacks.

The present applicant has now found that covering or coating compositions based on acrylic or alkyd resins and polyesters can be prepared having a homogeneous, reproducible effect without substantial undesirable coloration, even with moderate concentrations of the agents used.

The present invention therefore firstly provides a method for stabilizing acrylic or alkyd resin and polyester based lacquers and coatings against the action of atmospheric agents, the method consisting of mixing the composition of interest with at least one compound containing at least one sterically hindered piperidino, morpholino or pyrrolidino group, and at least one silyl function; the present invention also relates to the compositions thus obtained, to which other conventional stabilizers can be added. Such lacquers or coatings are stabilized according to the present invention by adding to the lacquers or coatings a reactive stabilizing compound characterised by containing in its molecule the 2,2,6,6-tetramethylpiperidine group:

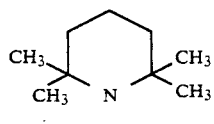

I or the 2,2,6,6-tetramethylpiperidine group:

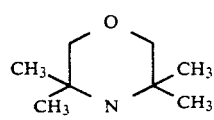

II or the 2,2,5,5-tetramethylpyrrolidine group:

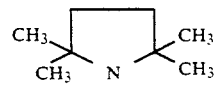

III said groups carrying at least one silyl function, hydrolyzable to silanol and connected to (I), (II) and (III) by a silicon-carbon bond.

The reactive stabilizing compounds usable in the method of the present invention can pertain to the following classes of compounds:

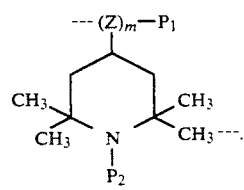

IV

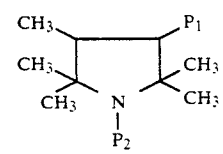

V

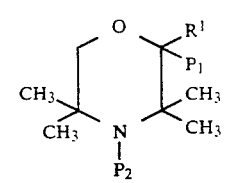

VI where: m is zero or one; $R^1$ is hydrogen or methyl; Z is a group chosen from

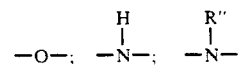

(where $R''$ is a $C_1$-$C_5$ linear or branched alkyl radical); at least one of $P_1$ and $P_2$ is a radical of formula:

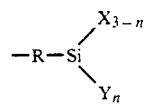

VII where n=1, 2 or 3; R is a $C_1$-$C_{10}$ linear or branched alkylene radical, or can be represented by

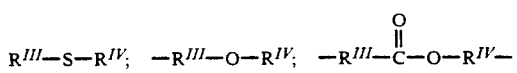

(where $R^{III}$ and $R^{IV}$ are linear or branched alkylene radicals containing together between 2 and 10 carbon atoms); X is a $C_{1-4}$ acyloxy, $(C_{1-4})$ alkyloxy, amino, amino-oxy or silyloxy; the other of $P_1$ and $P_2$ being:
 a) a $C_1$-$C_{10}$ linear or branched alkyl radical; or
 b) a phenyl, cycloaliphatic, alkylphenyl or alkylcycloaliphatic radical.

The stabilizing compounds in question can be obtained by following the preparation procedure described in European Patent Appln. Public. No. 0 263 561 of Apr. 13, 1988 in the name of the present applicant, of which the parts of interest enter by right into the description of the present invention.

Particular advantages have been obtained by using one or more of the following specific compounds covered by the aforesaid formulas IV, V or VI:

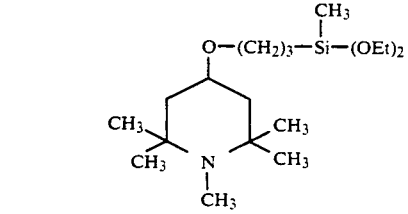  VIII

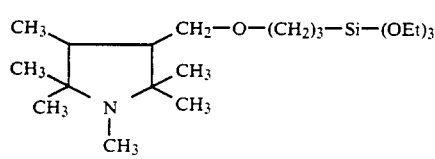  IX

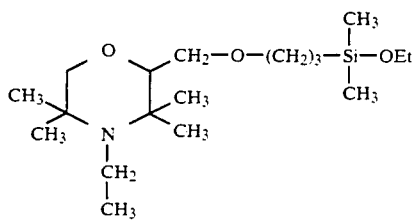  X

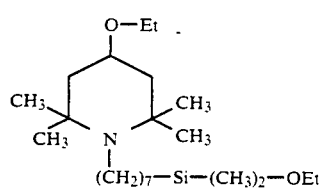  XI

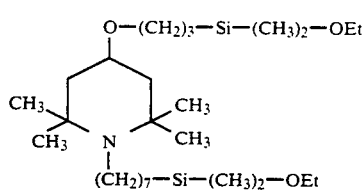  XII

In the particular case of piperidino groups, these can be present in a polysiloxane polymeric structure definable by the general formula:

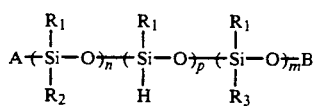  XIII where $R_1$ and $R_3$, which can be the same or different, are $C_1$-$C_{10}$ linear or branched alkyl radicals, or $C_5$-$C_{11}$ cycloaliphatic radicals, or phenyl radicals; $R_2$ is a radical chosen from those of formula:

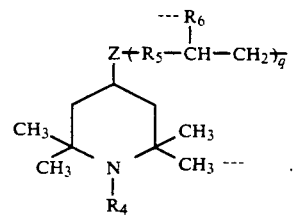

where $R_4$ is hydrogen, methyl or benzyl; $R_5$ is a $C_1$-$C_7$ linear or branched alkylene radical; Z is a group chosen from —O— and

(where $R_7$ is a $C_1$-$C_5$ linear or branched alkyl group or hydrogen); $R_6$ is hydrogen or methyl; q is zero or one; n is a whole number; m, p, which can be equal or different, are zero or whole numbers, with the condition that (n+p+m) is a whole number $\leq 50$; A is a group of formula:

  XV where $R_1$ has the aforesaid meaning; B is a group of formula:

  XVI where $R_1$ has the aforesaid meaning; or A and B together represent a direct bond, to give rise to a cyclic structure.

The stabilizers of the present invention, corresponding to said formula XIII, are polymers with a random distribution of monomer units and a linear or cyclic structure. In particular, they assume a linear structure when A and B are groups of formulas XV and XVI, whereas they assume a cyclic structure when A and B together represent a direct bond.

They are obtained as described in European Patent Appln. Public. No. 0 343 717 in the name of the present applicant, of which the parts of interest form a reference for the present invention. Particular advantages have also been obtained using specific compounds from those of said general formula XIII. These include:

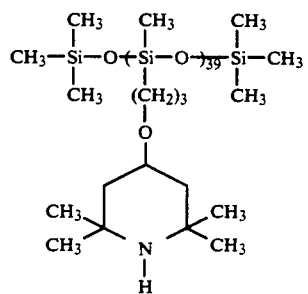  XVIII

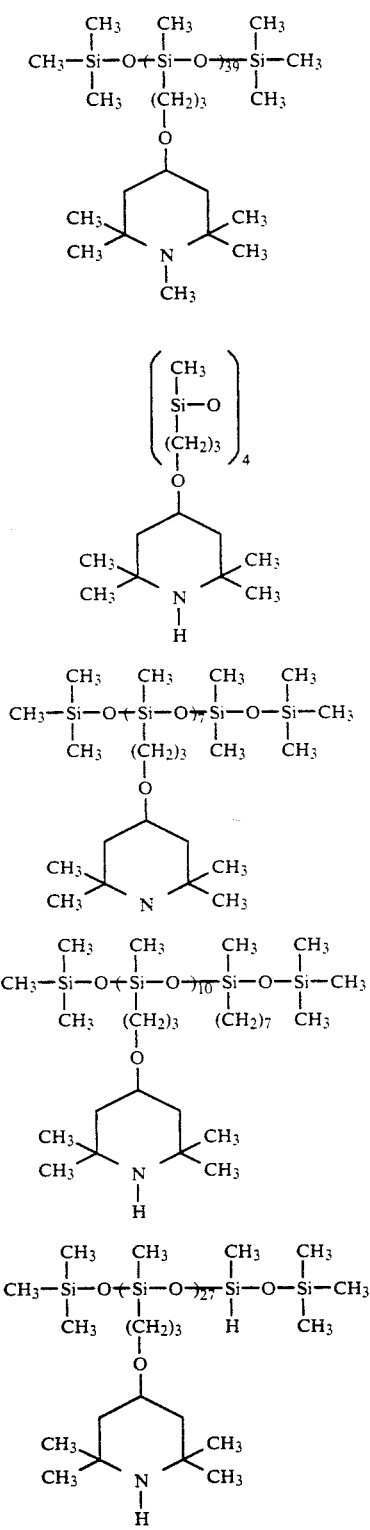

The acrylic resin based coatings which can be stabilized against the action of atmospheric agents according to the present invention are those well known to every expert of the art, such as those described in the "Textbook of Lacquers and Coatings", H. Kittel, volume 1, pages 735-742 (1972), or in "Synthetic Resins for Lacquers" by H. Wagner and H. F. Sarx, pages 229-235. Of particular interest is the stabilization of metal lacquers based on heat-crosslinkable polyacrylates incorporating styrene; the stabilization of alkyd resin based coatings is also of great interest, including those well known to every expert of the art. For example, alkyd, melamine or alkyd-acrylic-melamine lacquers can be protected.

The amount of stabilizers added according to the method of the present invention varies from 0.01 to 5% by weight on the basic compound of the coating concerned, and preferably from 0.5 to 1% by weight.

The final composition can contain an organic solvent, can be dissolved or dispersed in water or be presented as such. Antioxidants can also be added, chosen for example from sterically hindered phenolic compounds, organic phosphorus compounds, or other additives such as plasticizers, vulcanization accelerators, dispersants etc.

The invention is illustrated hereinafter by means of some examples, which must not however be taken as limitative thereof.

EXAMPLE 1

A) Preparation of a White Base Coat 24 parts of a saturated polyester resin solution (Dinapol LH-700 60%) and 8 parts of rutile $TiO_2$ (Kronos CL 310) were carefully homogenized (2500 r.p.m. for 10 minutes with a Cowless stirrer). The following were then added slowly while stirring:

a) 21.5 parts of a 25 wt % solution of cellulose acetobutyrate in butyl acetate (Cab 531-1 Eastman);

b) 13 parts of Solvesso 150, 17.5 parts of butyl acetate and 13 parts of xylene premixed for 15 minutes.

The compound was suitably refined in a microball mill for 30 minutes at 18° C.

3 parts of melamine resin (Maprenal MF 650 55% Hoechst) were added to the ground paste obtained.

The coating obtained in this manner was filtered through a double 325 mesh screen.

B) Preparation of a Transparent Top Coat 52.6 parts of an acrylic resin solution (Viacril VC 373 60% Hoechst) and 16.8 parts of a melamine resin solution (Cymel 1158 80% Cyanamid) were carefully homogenized.

The following were then added slowly while stirring:

a) 16 parts of xylene, 8 parts of cellosolve acetate and 5.5 parts of Solvesso 150 premixed for 15 minutes;

b) where specified (examples 2-7 and 9-11), the UV stabilizing additives as 10 wt % in xylene;

c) 1 part of a 1 wt % solution of silicone oil A (Bayer) in xylene.

When homogenization was complete, the transparent coating was filtered through a double 400 mesh screen.

The coating obtained in this manner has a 45% dry content and viscosity of 60/65 sec (Ford cup 4) at 20° C.

C) Coating of Plates

The coating tests were carried out on aluminium plates (precoated with a white base) of size 0.5×100×50 mm.

The spray apparatus consisted of a spray gun with a 1.2 mm nozzle and a spray cabin with air aspiration.

Method of Applying a Double Base Coat Layer (White and Red) and a Transparent Top Coat The base coat was diluted with cellosolve acetate to spray viscosity (<20 sec Ford cup 4 at 20° C.) and applied at 3.5-4 atmospheres. After 10 minutes the plate was over-sprayed with a transparent top coat, also diluted to spray viscosity.

After 5-6 minutes the plates were oven-hardened (T=130° C.) in a single baking for 30 min.

EXAMPLES 2, 3, 4, 5, 6, 7

Using the experimental procedure of Example 1, plates were prepared in which the stabilizers of Table 1 were added to the transparent top coat as described in Example 1 (B, b) in a 10% solution in xylene in the concentrations indicated.

EXAMPLE 8

A) Preparation of Red Base Coat 35 parts of a saturated polyester resin solution (Dinapol LH-700 60%), 4 parts of Novoperm red F3RK70 and 1 part of rutile $TiO_2$ (Kronos CL 310) were carefully homogenized (2500 r.p.m. for 10 minutes with a Cowless stirrer).

The following were then added slowly while stirring:
a) 21.5 parts of a 25 wt % solution of cellulose acetobutyrate in butyl acetate (Cab 531-1 Eastman);
b) 11 parts of Solvesso 150, 10 parts of butyl acetate and 13 parts of xylene premixed for 15 minutes.

The compound was suitably refined in a microball mill for 30 minutes at 18° C.

4.5 parts of melamine resin (Maprenal MF 650 55% Hoechst) were added to the ground paste obtained.

The coating obtained in this manner was filtered through a double 325 mesh screen.

B) Preparation of a Transparent Top Coat

The procedure described in paragraph B of Example 1 was followed.

C) Coating of Plates

The experimental procedure described in paragraph C of Example 1 was followed.

EXAMPLES 9, 10, 11

Using the experimental procedure described in Example 8, plates were prepared in which the stabilizers of Table 2 were added to the transparent top coat as described in Example 8 in a 10% solution in xylene in the concentrations indicated.

Applicational Tests

The plates obtained in the described experimental examples were subjected to accelerated ageing in a Weather-Ometer Ci 65, conditions camme 7 (cycle light 85%=102'; light+vater 15%=18'), BPT 55° C. (Black Panel Temperature).

Tables 1 and 2 show the behaviour of the plates.

TABLE 1

Double-coat automotive system UV stability

Top coat: acrylomelaminic; thickness 20 um.
Base coat: white melaminic polyester, thickness 20 um.
Exposition: WOM Ci 65, conditions camme 7, BPT 55° C.
Evaluation: fissures appearance in the top coat.

| Stabilizing system | AGEING TIMES (hours) | | | |
| --- | --- | --- | --- | --- |
|  | 1000 | 2000 | 4000 | 4500 |
| Ex. 1 — |  |  | G---2100 F |  |
| Ex. 2 0.5% UVASIL 299 | G | G | G | G |
| Ex. 3 0.5% UVASIL 816 | G | G | G | G |
| Ex. 4 0.5% HALS 1 |  |  | G---4080 F |  |

TABLE 1-continued

Double-coat automotive system UV stability

| Ex. 5 0.5% UVASIL 299 0.5% UVA 1 | G | G | G | G |
| --- | --- | --- | --- | --- |
| Ex. 6 0.5% UVASIL 816 0.5% UVA 1 | G | G | G | G |
| Ex. 7 0.5% HALS 1 0.5% UVA 1 | G | G | G---4560 |  |

G = good
F = fissures

TABLE 2

Double-coat automotive system UV stability

Top coat: acrylomelaminic; thickness 20 um.
Base coat: red melaminic polyester, thickness 20 um.
Exposition: WOM Ci 65, conditions camme 7, BPT 55° C.
Evaluation: fissures appearance in the top coat.

| Stabilizing system | AGEING TIMES (hours) | | | |
| --- | --- | --- | --- | --- |
|  | 1000 | 2000 | 4000 | 4500 |
| Ex. 8 — |  |  | G---1870 F | G |
| Ex. 9 0.5% UVASIL 299 | G | G | G | G |
| Ex. 10 0.5% UVASIL 816 | G | G | G | G |
| Ex. 11 0.5% HALS 1 | G |  | G---3927 |  |

G = good
F = fissures

We claim:

1. A method for stabilizing acrylic or alkyd resin and polyester based lacquers and coatings, comprising mixing the substance concerned with at least one compound containing at least one sterically hindered piperidino, morpholino or pyrrolidino group, and at least one silyl function.

2. A method for stabilizing lacquers and coatings as claimed in claim 1, wherein the stabilizing compound is chosen from those containing at least one of the compounds corresponding to the following formulas:

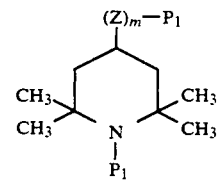

IV

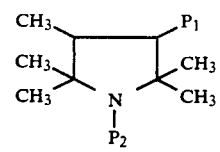

V

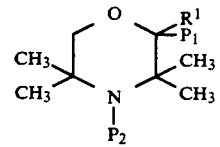

VI where: m is zero or one; $R^1$ is hydrogen or methyl; Z is a group chosen from

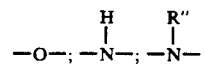

(where R" is a $C_1$-$C_5$ linear or branched alkyl radical); at least one of $P_1$ and $P_2$ is a radical of formula:

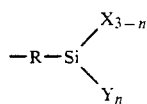

where n is 1, 2 or 3; R is a $C_1$-$C_{10}$ linear or branched alkylene radical, or can be represented by

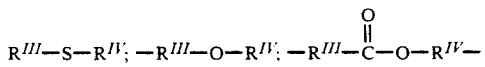

(where $R^{III}$ and $R^{IV}$ are linear or branched alkylene radicals containing together between 2 and 10 carbon atoms); X is a $C_1$-$C_5$ linear or branched alkyl radical; Y is hydrogen, halogen, ($C_{1-4}$) acyloxy, ($C_{1-4}$) alkyloxy, amino, amino-oxy or silyloxy; the other of $P_1$ and $P_2$ being:

a) a $C_1$-$C_{10}$ linear or branched alkyl radical; or
b) a phenyl, cycloaliphatic, alkylphenyl or alkylcycloaliphatic radical.

3. A method for stabilizing lacquers and coatings as claimed in claim 1, characterised in that the piperidino group is contained in a polysiloxane structure definable by the formula:

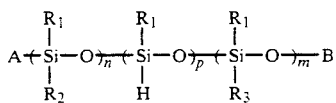

where $R_1$ and $R_3$, which can be the same or different, are $C_1$-$C_{10}$ linear or branched alkyl radicals, or $C_5$-$C_{11}$ cycloaliphatic radicals, or phenyl radicals; $R_2$ is a radical chosen from those of formula:

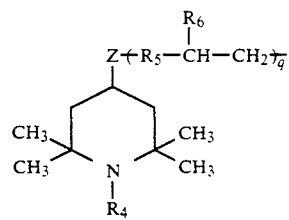

where $R_4$ is hydrogen, methyl or benzyl; $R_5$ is a $C_1$-$C_7$ linear or branched alkylene radical; Z is a group chosen from —O— and

(where $R_7$ is a $C_1$-$C_5$ linear or branched alkyl group or hydrogen); $R_6$ is hydrogen or methyl; q is zero or one; n is a whole number; m, p, which can be equal or different, are zero or whole numbers, with the condition that (n+p+m) is a whole number $\leq 50$; A is a group of formula:

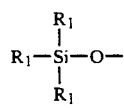

where $R_1$ has the aforesaid meaning; B is a group of formula;

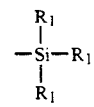

where $R_1$ has the aforesaid meaning; or A and B together represent a direct bond, to give rise to a cyclic structure.

4. A method for stabilizing lacquers and coatings as claimed in claim 2, wherein the stabilizing compound is preferably chosen as one or more of those corresponding to formulas VIII to XII.

5. A method for stabilizing lacquers and coatings as claimed in claim 3, wherein the stabilizing compound is preferably chosen as one or more of those corresponding to formulas XVII to XXIII.

6. A method for stabilizing lacquers and coatings as claimed in claim 1, wherein the stabilizing compound is used in a quantity of between 0.01 and 5% by weight on the base compound of the lacquer or coating concerned.

7. A method for stabilizing lacquers and coatings as claimed in claim 6 wherein the quantity of stabilizer is preferably between 0.5 and 1% by weight.

8. An acrylic or alkyd resin and polyester based lacquer or coating composition stabilized by adding at least one compound containing at least one sterically hindered piperidino, morpholino or pyrrolidino group, and at least one silyl function, chosen from those corresponding to the formulation of claim 1.

9. A method for stabilizing acrylic or alkyd resins and polyester-based lacquers and coatings, comprising mixing the substance concerned with at least one compound containing at least one sterically hindered piperidino group, wherein the piperidino group is contained in a polysiloxane having a polysiloxane structure defined by the formula:

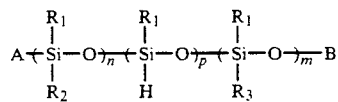

where $R_1$ and $R_3$, which can be the same or different, are $C_1$-$C_{10}$ linear or branched alkyl radicals, or $C_5$-$C_{11}$ cycloaliphatic radicals, or phenyl radicals; $R_2$ is a radical chosen from those of formula:

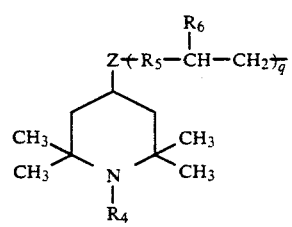

where $R_4$ is hydrogen, methyl or benzyl; $R_5$ is a $C_1$-$C_7$ linear or branched alkylene radical; Z is a group chosen from —O— and

where $R_7$ is a $C_1$–$C_5$ linear or branched alkyl group or hydrogen; $R_6$ is hydrogen or methyl; q is zero or one; n is a whole number; m, p, which can be equal or different: are zero or whole numbers, with the condition that (n+p+m) is a whole number $\leq 50$; A is a group of formula:

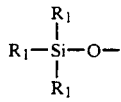 XV where $R_1$ has the aforesaid meaning; B is a group of formula:

 XVI where $R_1$ has the aforesaid meaning; or A and B together represent a direct bond, to give rise to a cyclic structure.

10. An acrylic or alkyd resin and polyester-base lacquer or coating composition stabilized by adding at least one compound having a polysiloxane structure, chosen from those corresponding to the formulation of claim 9.

* * * * *